United States Patent [19]

Jandt et al.

[11] 4,095,807
[45] Jun. 20, 1978

[54] SLIDE RING SEAL

[75] Inventors: Siegfried Jandt, Leverkusen; Gerhard Hammerschmidt, Burscheid, Rheinland, both of Germany

[73] Assignee: Goetzewerke Friedrich Goetze AG, Burscheid, Germany

[21] Appl. No.: 824,692

[22] Filed: Aug. 15, 1977

Related U.S. Application Data

[63] Continuation of Ser. No. 646,836, Jan. 5, 1976, abandoned.

[30] Foreign Application Priority Data

Jan. 3, 1975 Germany ............................ 2500098

[51] Int. Cl.² .......................... F16J 15/36; C09J 7/02
[52] U.S. Cl. ........................................ 277/40; 277/43; 277/88; 277/92; 277/95; 428/40; 428/352
[58] Field of Search .......................... 277/1, 9, 38–43, 277/81 R, 85, 88, 92, 95; 428/40, 352

[56] References Cited

U.S. PATENT DOCUMENTS

| 3,342,625 | 9/1967 | Grossman et al. | 428/352 |
| 3,394,799 | 7/1968 | Ritson et al. | 428/352 |
| 3,536,333 | 10/1970 | Gits et al. | 277/38 X |
| 3,554,559 | 1/1971 | Dahlheimer | 277/85 X |
| 3,675,844 | 7/1972 | Sorrell | 428/40 |
| 3,753,755 | 8/1973 | Olson | 428/40 |
| 3,782,735 | 1/1974 | Novosad | 277/88 X |
| 3,822,066 | 7/1974 | Keys | 277/88 X |
| 3,887,200 | 6/1975 | Engelking et al. | 277/88 |

FOREIGN PATENT DOCUMENTS

| 1,122,075 | 5/1956 | France | 277/40 |
| 785,665 | 10/1957 | United Kingdom | 277/42 |
| 1,380,522 | 1/1975 | United Kingdom | 277/42 |

Primary Examiner—Robert S. Ward, Jr.
Attorney, Agent, or Firm—Spencer & Kaye

[57] ABSTRACT

A slide ring seal for arrangement between relatively rotating machine components has a counter ring which at one end face is stationarily and sealingly attached to a machine component by means of a double-sided adhesive foil and at its other end face slidingly engages a slide ring.

2 Claims, 1 Drawing Figure

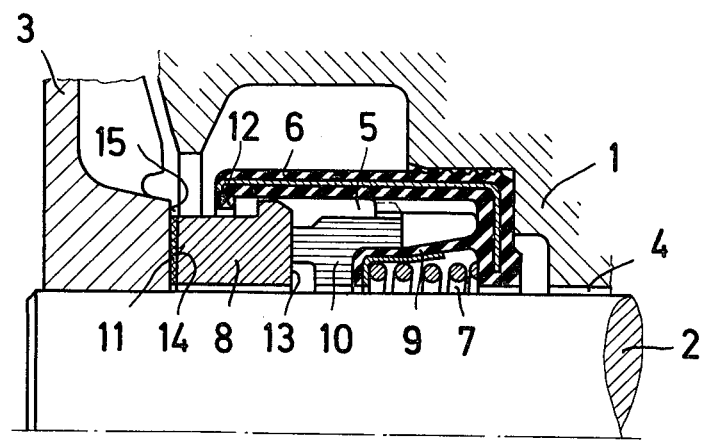

SLIDE RING SEAL

CROSS-REFERENCE TO RELATED APPLICATION

This application is a continuation of application Ser. No. 646,836, filed Jan. 5, 1976 now abandoned.

BACKGROUND OF THE INVENTION

This invention relates to a counter ring for a slide ring seal. The counter ring is adapted to be affixed stationarily and sealingly to a rotary or non-rotary machine component by means of an intermediate layer having high adhering properties.

For the stationary and, at the same time, sealing positioning of counter rings of slide ring seals relative to the machine components (such as machine housings or shafts) which receive the rings, in most cases elastically yielding intermediate rubber layers of disc shape or O-rings have been used. As a result of the axial sealing force acting on the intermediate rubber layer through the counter ring, the latter is secured against rotation by virtue of the adhering properties of the rubber material. At the same time, there is achieved a static seal between the counter ring and the associated machine component.

Particularly in those structures in which the counter ring of a slide ring seal is combined with the latter into a structural unit for shipment, storage and assembly, there is encountered the problem of a simplified, more easily assemblable arrangement for securing against rotation and for providing a static seal, particularly between the counter ring and the associated machine component.

SUMMARY OF THE INVENTION

It is an object of the invention to provide an improved counter ring of the above-outlined type for improving the manufacture and the application of an intermediate layer, to increase the adhering properties of the intermediate layer and to facilitate the assembly of the slide ring seal unit.

This object and others to become apparent as the specification progresses, are accomplished by the invention, according to which, briefly stated, the intermediate layer is formed of a double-sided adhesive foil.

The adhesive foil is applied preferably to the rear radial face of the slide ring, that is, to the radial face which is oriented away from the sliding interface of the counter ring and the slide ring. For storing and shipping the slide ring seal unit, it is advantageous to cover the exposed surface of the adhesive foil with a removable protective sheet to prevent soiling or inadvertent contacting. The protective sheet is easily removable immediately before the assembling operation.

The invention makes possible not only a particularly simple and economical manufacture and application of an intermediate layer in slide ring seals, but also improves its function, since by axially pressing the counter ring onto the associated machine component, a stationary and sealing connection is ensured which is entirely independent from the axial sealing force. Further, despite its high adhering properties, the counter ring, as opposed to the conventional adhering connections, can be easily removed in case of repairs or if a replacement of the entire sealing unit is required.

BRIEF DESCRIPTION OF THE DRAWING

The sole FIGURE shows a preferred embodiment of the invention in an axial sectional view.

DESCRIPTION OF THE PREFERRED EMBODIMENT

Turning now to the FIGURE, there is shown a part of a coolant pump of an automobile in which the invention may find exemplary application. There is shown a pump of an automobile housing 1, a rotary shaft 2 and an impeller 3 affixed to the shaft end. For sealing off the annular gap 4 between the pump housing 1 and the shaft 2, there is provided a slide ring seal unit 5 which comprises a seal housing 6 and a slide ring 10 which is axially urged against a counter ring 8 by a spring 7 and which is statically sealed by a rubber cup 9. For a stationary and sealing connection of the counter ring 8 with the impeller 3 there is provided an intermediate layer 11 formed of a double-sided adhesive foil. As seen in the FIGURE, the housing components 6 and 9 combine the spring 7, the counter ring 8 and the slide ring 10 into an integral structural unit. The double sided adhesive foil 11 can for example be the commercially available type No. 4292 manufactured by the Minnesota Mining and Manufacturing Company U.S.A. having a 30 – 50 micrometer thick adhesive layer either side of a carrier foil that is 0.6 millimeter thick. By virtue of the adhesion of the foil 11 to the impeller 3 and the counter ring 8, the latter rotates with the shaft 2 in unison, while the other components of the slide ring seal 5 remain non-rotary with the pump housing 1.

The slide ring seal unit 5 is, during manufacture, provided with the counter ring 8 which is prevented by a collar 12 from axially sliding out of the seal housing 6 and which is provided with the double-sided adhesive foil 11 on the radial face 14 oriented axially away from the radial slide face 13. After installing the slide ring seal 5 in the pump housing 1, a protective sheet (not shown) is removed from the outwardly oriented face of the adhesive foil 11, whereupon the impeller 3 is mounted on and secured to the end of the shaft 2. During this operation, by virtue of the force exerted by the spring 7, the counter ring 8 is pressed against the inwardly oriented radial face 15 of the impeller wheel 3, whereby the counter ring 8 is fixedly and sealingly glued to the face 15 of the impeller wheel 3.

It will be understood that the above description of the present invention is susceptible to various modifications, changes and adaptations, and the same are intended to be comprehended within the meaning and range of equivalents of the appended claims.

What is claimed is:

1. In a slide ring seal for arrangement between relatively rotating machine components, the combination comprising
   (a) a housing;
   (b) a slide ring stationarily supported in said housing and having a first end face;
   (c) a counter ring rotatably supported in said housing and having a second end face oriented towards said first end face and a third end face oriented outwardly of said housing;
   (d) a spring supported in said housing and urging said slide ring, with its said first end face, into contact with said second end face of said counter ring; said housing combining said slide ring, said counter ring and said spring into an integral structural unit; and (e) a double-sided adhesive foil having a first side and an oppositely oriented second side; said first side of the foil being attached to said third end face of said counter ring and said second side of the foil being attachable to a machine component for effecting a torque-transmitting and sealing adherence of said counter ring to the machine component.

2. A slide ring seal as defined in claim 1, wherein said second side of said adhesive foil is covered by a removable protective sheet.

* * * * *